(12) United States Patent
Jiang et al.

(10) Patent No.: US 11,509,371 B2
(45) Date of Patent: Nov. 22, 2022

(54) INFORMATION FEEDBACK METHOD AND DEVICE, STORAGE MEDIUM, AND ELECTRONIC DEVICE

(71) Applicant: ZTE Corporation, Shenzhen (CN)

(72) Inventors: Chuangxin Jiang, Shenzhen (CN); Bo Gao, Shenzhen (CN); Hao Wu, Shenzhen (CN); Nan Zhang, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 84 days.

(21) Appl. No.: 17/256,037

(22) PCT Filed: Apr. 16, 2019

(86) PCT No.: PCT/CN2019/082846
§ 371 (c)(1),
(2) Date: Dec. 24, 2020

(87) PCT Pub. No.: WO2020/001132
PCT Pub. Date: Jan. 2, 2020

(65) Prior Publication Data
US 2021/0273709 A1  Sep. 2, 2021

(30) Foreign Application Priority Data

Jun. 25, 2018 (CN) .......................... 201810663295.9

(51) Int. Cl.
*H04B 7/0417* (2017.01)
*H04B 7/06* (2006.01)
*H04B 7/0456* (2017.01)

(52) U.S. Cl.
CPC ......... *H04B 7/0626* (2013.01); *H04B 7/0417* (2013.01); *H04B 7/0486* (2013.01); *H04B 7/0639* (2013.01)

(58) Field of Classification Search
CPC .. H04B 7/0626; H04B 7/0417; H04B 7/0486; H04B 7/0639; H04B 7/063;
(Continued)

(56) References Cited

U.S. PATENT DOCUMENTS 9,794,955 B2  10/2017 Chen
2016/0164591 A1  6/2016 Zhang
(Continued)

FOREIGN PATENT DOCUMENTS

CA  3047229 A1  6/2018
CN  102271031 A  12/2011
(Continued)

OTHER PUBLICATIONS

International Search Report for corresponding application PCT/CN2019/082846 filed Apr. 16, 2019; dated Jul. 3, 2019.
(Continued)

*Primary Examiner* — Minh Trang T Nguyen
(74) *Attorney, Agent, or Firm* — Cantor Colburn LLP

(57) ABSTRACT

Provided are an information feedback method and device, a storage medium, and an electronic device. The method includes that: N pieces of feedback information are determined according to one Channel State Information (CSI) report configuration, wherein the N pieces of feedback information includes N Rank Indications (RIs) and N Precoding Matrix Indications (PMIs), and N is an integer greater than or equal to 1; and the N pieces of feedback information are sent to a base station.

17 Claims, 2 Drawing Sheets

Determine N pieces of feedback information according to one CSI report configuration, wherein each piece of feedback information at least includes: an RI, a PMI, and a non-zero wideband amplitude coefficient that is fed back, and N is an integer greater than or equal to 1 — S202

Send the N pieces of feedback information to the base station — S204

(58) Field of Classification Search
CPC ... H04B 7/0632; H04L 1/0026; H04L 1/0028; H04L 5/0023; H04L 5/0048; H04L 5/0057; H04L 5/0091; H04L 5/0055
See application file for complete search history.

(56) References Cited

U.S. PATENT DOCUMENTS

| | | | |
|---|---|---|---|
| 2016/0269084 A1 | 9/2016 | Nam | |
| 2017/0111098 A1 | 4/2017 | Kim | |
| 2018/0175993 A1 | 6/2018 | Onggosanusi | |
| 2019/0036569 A1 | 1/2019 | Deng | |
| 2019/0319689 A1* | 10/2019 | Wu | H04B 7/066 |

FOREIGN PATENT DOCUMENTS

| | | |
|---|---|---|
| CN | 106411377 A | 2/2017 |
| CN | 107294583 A | 10/2017 |
| CN | 10766341 A | 2/2018 |
| CN | 108023621 A | 5/2018 |
| CN | 108028742 A | 5/2018 |
| EP | 2645616 A2 | 2/2013 |
| EP | 3537620 A1 | 11/2017 |
| KR | 1020180022516 | 3/2018 |
| WO | 2017165447 A1 | 9/2017 |
| WO | 2017167238 A1 | 10/2017 |
| WO | 2018082701 A1 | 5/2018 |
| WO | 2018097600 A1 | 5/2018 |

OTHER PUBLICATIONS

3GPP TSG RAN WG1 Meeting AH 1801, ZTE, Sanechips, "Remaining details on CSI measurement", Vancouver, Canada, Jan. 22-26, 2018, R1-1800108.

European Search Report for corresponding application EP19827115.7; dated Jul. 21, 2021.

* cited by examiner

INFORMATION FEEDBACK METHOD AND DEVICE, STORAGE MEDIUM, AND ELECTRONIC DEVICE

CROSS-REFERENCE TO RELATED APPLICATIONS

The present application claims priority to Chinese Patent Application No. 201810663295.9, filed before the China National Intellectual Property Administration (CNIPA) on Jun. 25, 2018, the entire contents of which are incorporated herein by reference.

TECHNICAL FIELD

The present application relates to the field of communications, for example, to an information feedback method and device, a storage medium, and an electronic device.

BACKGROUND

In related technologies, if New Radio (NR) supports simultaneous transmission of multiple panels/beams/Tx/Rx Points (TRP), the accuracy of the current Channel State Information (CSI) feedback mechanism will be greatly reduced. In order to improve the accuracy of CSI feedback in the scenario of simultaneous transmission of multiple panels/beams/TRPs, a new feedback mechanism should be introduced.

In the NR of related technologies, one Transmission Configuration Indicator (TCI) includes one or two qcl-Types, and the one or two qcl-Types may be regarded as one qcl-set, which provides a Quasi Co-Location (QCL) relationship for a target Reference Signal (RS), that is, provides a QCL relationship between the RS configured in the qcl-Type and the target RS. The target RS may be a Channel State Information Reference Signal (CSI-RS), a Demodulation Reference Signal (DMRS), etc.

That is, one TCI includes one or two RSs (configured in QCL-Info), which may be regarded as one RS-set, which is used to indicate the QCL relationship between the target RS and the RS. If the TCI includes two RSs, that is, qcl-Type1 and qcl-Type2 are configured, then the types of QCL configured in the qcl-Type1 and the qcl-Type2 are different, for example, the qcl-Type configured in the qcl-Type1 is type A (Doppler shift, Doppler spread, average delay, delay spread), and the qcl-Type configured in the qcl-Type2 is type D (Spatial Rx parameter which may be understood as a beam).

If the target RS is the CSI-RS, then generally each CSI-RS resource may be configured with one TCI. If the CSI-RS is used for CSI acquisition, then generally a base station will configure one CSI-RS resource set to UE, and one or more CSI-RS resources may be configured in each CSI-RS resource set. After a user conducts channel measurement for each CSI-RS resource, a CSI-RS Resource Indicator (CRI) will be fed back to indicate which CSI-RS resource has the best quality. At the same time, for different feedback configurations, the UE may also need to feed back a Rank Indication (RI), a Precoding Matrix Indication (PMI), a Channel Quality Indicator (CQI), etc. For example, the types of CSI feedback may include 'cri-RI-PMI-CQI', 'cri-RI-i1-CQI', 'cri-RI-LI-PMI-CQI', 'cri-RI-i1' or 'cri-RI-CQI'. Under the current NR design architecture, the type of CSI feedback is configured under the parameter CSI-ReportConfig. It can be seen that for each CSI reporting setting or CSI report configuration (CSI-ReportConfig), the UE only needs to report one CRI, one RI, one PMI, and one or two CQIs. For the sub-band based feedback, certain components in PMI and the CQI are fed back for each sub-band, and one or two CQIs are fed back for each sub-band.

The above feedback mechanism may be applied to single TRP/panel/beam transmission. However, if multiple TRPs, multiple panels or multiple beams need to be simultaneously used to transmit data to a user, there are some problems with the above mechanism. For example, for CSI measurement feedback, the UE only feeds back one CRI, and one CRI corresponds to one CSI-RS resource. The CSI-RS resource is configured with only one TCI, and the TCI includes only one RS, which is corresponding to the QCL type D (Spatial Rx parameter), namely only corresponding to one beam. If the base station schedules multi-beam transmission, the CSI fed back by the UE is not accurate (because the feedback content is determined based on the assumption of single beam transmission), which will results in a direct mismatch between a scheduling channel and an actual channel, and further affect the quality of data transmission.

For the above situation existing in related technologies, no effective solution has been found yet.

SUMMARY

Embodiments of the present application provide an information feedback method and device, a storage medium, and an electronic device.

According to an embodiment of the present application, an information feedback method is provided, which includes that: N pieces of feedback information are determined according to one CSI report configuration, wherein each piece of feedback information at least includes an RI, a PMI and a non-zero wideband amplitude coefficient that is fed back, and N is an integer greater than or equal to 1; and the N pieces of feedback information are sent to a base station.

According to an embodiment of the present application, another information feedback method is provided, which includes that: N pieces of feedback information sent by a UE according to one CSI report configuration are received, wherein each piece of feedback information at least includes an RI, a PMI and a non-zero wideband amplitude coefficient that is fed back, and N is an integer greater than or equal to 1.

According to another embodiment of the present application, an information feedback device is provided, which includes: a determining module and a sending module. The determining module is configured to determine N pieces of feedback information according to one CSI report configuration, wherein each piece of feedback information at least includes an RI, a PMI and a non-zero wideband amplitude coefficient that is fed back, and N is an integer greater than or equal to 1. The sending module is configured to send the N pieces of feedback information to a base station.

According to an embodiment of the present application, another information feedback device is provided, which includes a receiving module. The receiving module is configured to receive N pieces of feedback information sent by a UE according to one CSI report configuration, wherein each piece of feedback information at least includes an RI, a PMI and a non-zero wideband amplitude coefficient that is fed back, and N is an integer greater than or equal to 1.

According to yet another embodiment of the present application, a storage medium is further provided. The storage medium stores a computer program. The computer program is configured to perform operations in any of the above method embodiments at runtime.

According to yet another embodiment of the present application, an electronic device is further provided, which includes a memory and a processor. The memory stores a computer program. The processor is configured to run the computer program to perform operations in any of the above method embodiments.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings.

DETAILED DESCRIPTION OF THE EMBODIMENTS

Figure 1:
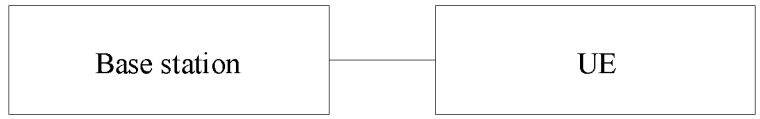
FIG. 1 is a diagram showing network architecture according to an embodiment of the present application.

The present disclosure is described below with reference to the drawings and in conjunction with the embodiments in detail. It is to be noted that embodiments in the present application and characteristics in the embodiments may be combined to derive other embodiments not explicitly described.

It is to be noted that the specification and claims of the present disclosure and the terms "first", "second" and the like in the drawings are used to distinguish similar objects, and are not used to describe a specific sequence or a precedence order.

Embodiment 1

The present embodiment of the present application may be implemented on a network architecture shown in FIG. 1. FIG. 1 is a diagram showing the network architecture according to an embodiment of the present application. As shown in FIG. 1, the network architecture includes: a base station and a UE. The base station can communicate with the UE.

Figure 2:
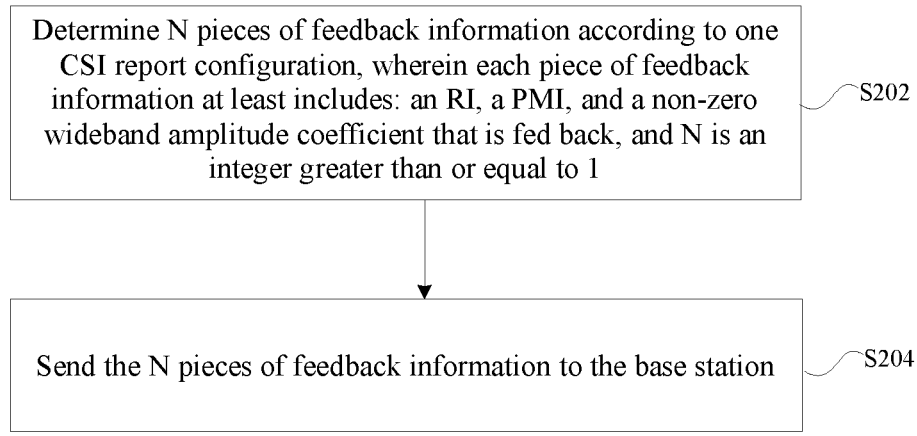
FIG. 2 is a flowchart of information feedback according to an embodiment of the present application.

In the present embodiment, an information feedback method implemented on the above network architecture is provided. FIG. 2 is a flowchart of information feedback according to an embodiment of the present application. As shown in FIG. 2, the flow includes the following operations S202 and S204.

At S202, N pieces of feedback information are determined according to one CSI report configuration. Each piece of feedback information at least includes: an RI, a PMI, and a non-zero wideband amplitude coefficient that is fed back. In the embodiment, N is an integer greater than or equal to 1.

At S204, the N pieces of feedback information are sent to the base station.

Through the above operations, N pieces of feedback information are determined according to one CSI report configuration and sent to the base station, so that simultaneous transmission based on multiple panels/beams/TRPs can be supported between the UE and the base station, and a scheduling channel and an actual channel can be matched. In this way, the technical problem of inaccurate CSI feedback in related technologies is solved, and the application scenarios of the communication system are expanded.

In an embodiment, the executer of the above operations may be, but is not limited to be, UE such as a mobile phone and vehicle-mounted equipment.

Figure 3:
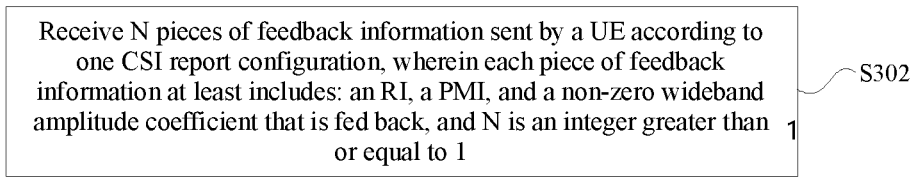
FIG. 3 is a flowchart of another information feedback according to an embodiment of the present application.

In the present embodiment, another information feedback method implemented on the above network architecture is provided. FIG. 3 is a flowchart of another information feedback according to an embodiment of the present application. As shown in FIG. 3, the flow includes the following operation S302.

At S302, N pieces of feedback information sent by a UE according to one CSI report configuration are received. Each piece of feedback information includes: an RI, a PMI, and a non-zero wideband amplitude coefficient that is fed back. In the embodiment, N is an integer greater than or equal to 1. In the embodiment, the executer of the above operation may be, but is not limited to be, a network element such as the base station.

In an embodiment, the expression "according to one CSI report configuration" may be understood as "for one CSI report configuration".

In an embodiment, when a sum of the N RIs is less than or equal to 4, the N pieces of feedback information further include one CQI. When the sum of the N RIs is greater than 4, the N pieces of feedback information further include two CQIs.

In the present embodiment, the N pieces of feedback information refer to N RIs, N PMIs, and N non-zero wideband amplitude coefficients that are fed back.

In an embodiment, N is equal to the number of QCL sets which are contained in one or more TCIs respectively configured in one or more CSI-RS resources corresponding to one or more CRIs, and the feedback information further includes the one or more CRIs. In an embodiment, the number of the one or more CRIs is 1. In some embodiments, the number of TCIs configured in one CSI-RS resource is 1.

In an embodiment, N is equal to the number of TCIs configured in one or more CSI-RS resources corresponding to one or more CRIs. The feedback information further includes the one or more CRIs. In an embodiment, the number of the one or more CRIs is 1. In an embodiment, the number of QCL sets contained in one TCI is 1.

In an embodiment, N is equal to the number of CRIs. The feedback information further includes the CRIs. In an embodiment, the number of QCL sets configured in each CSI-RS resource in the CSI-RS resource set is equal to 1. In other words, the number of TCIs configured in each CSI-RS resource in the CSI-RS resource set is equal to 1, and the number of QCL sets contained in each TCI is equal to 1.

In an embodiment, a maximum value of N is notified by higher layer signaling to the UE. The UE selects an appropriate N according to at least one of the above strategies in the range defined by the maximum value of N.

In an embodiment, when there is only one CSI-RS resource configured in the CSI-RS resource set, the feedback information does not include the one or more CRIs. The one or more CSI-RS resources corresponding to the one or more CRIs are one or more CSI-RS resources contained in a CSI-RS resource set.

In an embodiment, a feedback overhead of the RIs is determined based on a CSI-RS resource, which is configured with a TCI containing the most QCL sets, in the CSI-RS resource set.

In an embodiment, a feedback overhead of the RIs is determined based on a CSI-RS resource, which is configured with the most TCIs, in the CSI-RS resource set.

In an embodiment, the N RIs are jointly fed back by a same signaling (for example, by one index).

In an embodiment, when N is greater than 1, the first PMI is set in a CSI part 2, and the second PMI is set in a CSI part 3.

In an embodiment, there is a one-to-one correspondence in the N pieces of feedback information. Specifically, there is a one-to-one correspondence among the N RIs, the N PMIs, and the N non-zero wideband amplitude coefficients that are fed back. In some exemplary scenarios, there is a one-to-one correspondence among the N RIs, the N PMIs, the N non-zero wideband amplitude coefficients that are fed back, and N CRIs.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

Embodiment 2

The present embodiment provides an information feedback device. The apparatus is used to implement the above embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 4:
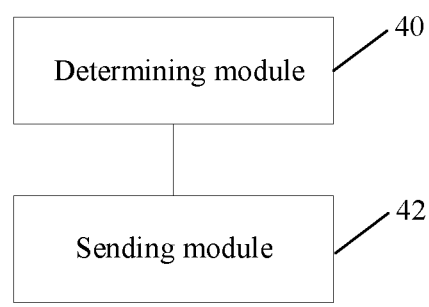
FIG. 4 is a structure diagram of an information feedback device according to an embodiment of the present application.

FIG. 4 is a structure diagram of an information feedback device according to an embodiment of the present application. As shown in FIG. 4, the device includes: a determining module 40 and a sending module 42.

The determining module 40 is configured to determine N pieces of feedback information according to one CSI report configuration. Each piece of feedback information includes an RI, a PMI, and a non-zero wideband amplitude coefficient that is fed back. In the embodiment, N is an integer greater than or equal to 1.

The sending module 42 is configured to send the N pieces of feedback information to the base station.

Figure 5:
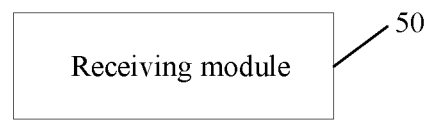
FIG. 5 is a structure diagram of another information feedback device according to an embodiment of the present application.

FIG. 5 is a structure diagram of another information feedback device according to an embodiment of the present application. As shown in FIG. 5, the device includes: a receiving module 50.

The receiving module 50 is configured to receive the N pieces of feedback information sent by the UE according to one CSI report configuration. Each piece of feedback information includes an RI, a PMI, and a non-zero wideband amplitude coefficient that is fed back. In the embodiment, N is an integer greater than or equal to 1

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Embodiment 3

The present embodiment includes multiple implementation modes, based on which the solution of the present application is described in detail.

Implementation Mode 1-1:

The next version of NR may introduce multiple beams, panels or TRPs to simultaneously transmit data to the UE. If only one CRI is fed back, a mismatch between the feedback and the actual scheduling would be resulted due to the following reason: only one TCI configuration is configured in the CSI-RS resource corresponding to one CRI, each TCI configuration contains only one QCL set, and one QCL set corresponds to only one beam, panel or TRP.

For a Type I codebook, in order to improve the accuracy of measurement and feedback of the channel state quality under the transmission of multiple TRPs/panels/beams, for one CSI report configuration, the base station may configure that the UE feeds back N CRIs at most for one CSI-RS resource set. The value of N may be configured by higher layer signaling (which is generally Resource Control (RRC) signaling, but Medium Access Control (MAC) signaling is not excluded). Different values of N may be configured for different CSI report configurations. For example, for the CSI-RS resource set 0 associated with the CSI report configuration 0, N is configured as 1; and for the CSI-RS resource set 1 associated with the CSI report configuration 1, N is configured as 2. The value of N may be configured under a CSI report, and the values of N configured under different CSI reports may be different. After the value of N is configured by higher layer signaling, the UE needs to select a maximum of N CSI-RS resources from M CSI-RS resources in the CSI-RS resource set and report the selected CSI-RS resources to the base station, that is, report a maximum of N CRIs. The number of the selected CSI-RS resources does not always have to be N, it can be less than N. For example, if one CSI-RS resource set contains four CSI-RS resources (CSI-RS resources 0, 1, 2, 3), and the value of N configured by the base station in the CSI report configuration (CSI-ReportConfig) is 2, then the possible combinations of CRIs fed back by the UE are shown in Table 1. There are 10 possibilities respectively marked by the index 0-9. Indexes 0, 4, 7, 9 indicate that the UE feeds back only one CRI. So, multiple CRIs may be jointly fed back.

TABLE 1

| A maximum of N CRIs are jointly reported | | |
|---|---|---|
| CRI index | CRI0 | CRI1 |
| 0 | CSI-RS resource 0 | |
| 1 | CSI-RS resource 0 | CSI-RS resource 1 |
| 2 | CSI-RS resource 0 | CSI-RS resource 2 |

TABLE 1-continued

A maximum of N CRIs are jointly reported

| CRI index | CRI0 | CRI1 |
|---|---|---|
| 3 | CSI-RS resource 0 | CSI-RS resource 3 |
| 4 | CSI-RS resource 1 | |
| 5 | CSI-RS resource 1 | CSI-RS resource 2 |
| 6 | CSI-RS resource 1 | CSI-RS resource 3 |
| 7 | CSI-RS resource 2 | |
| 8 | CSI-RS resource 2 | CSI-RS resource 3 |
| 9 | CSI-RS resource 3 | |

If the number of CRIs corresponding to a CRI index is actually N1, then the UE needs to feed back N1 RIs.

The N1 RIs may be jointly fed back. Alternatively, the N1 RIs and the CRI index may be jointly fed back. For example, the maximum value of RI supported by a UE is 4, that is, the sum of N1 RIs should not exceed 4. Table 2 shows the joint feedback of the CRI and RI.

TABLE 2

Multiple CRIs and RIs are jointly reported

| index | CRI0 | CRI1 | RI0 | RI1 |
|---|---|---|---|---|
| 0 | CSI-RS resource 0 | | 1 | |
| 0 | CSI-RS resource 0 | | 2 | |
| 0 | CSI-RS resource 0 | | 3 | |
| 0 | CSI-RS resource 0 | | 4 | |
| 4 | CSI-RS resource 0 | CSI-RS resource 1 | 1 | 1 |
| 5 | CSI-RS resource 0 | CSI-RS resource 1 | 1 | 2 |
| 6 | CSI-RS resource 0 | CSI-RS resource 1 | 2 | 1 |
| 7 | CSI-RS resource 0 | CSI-RS resource 1 | 2 | 2 |
| 8 | CSI-RS resource 0 | CSI-RS resource 1 | 3 | 1 |
| 9 | CSI-RS resource 0 | CSI-RS resource 1 | 1 | 3 |
| ... | ... | ... | ... | ... |

Different CRIs may be understood as different panels, beams or TRPs, so the different CRIs should correspond to transmission of different PMIs. Of course, in practical transmission, multiple PMIs may be jointly transmitted.

If the sum of multiple reported RIs is not greater than 4, the multiple panels/beams/TRPs may jointly transmit the same TB to the UE. In order to acquire more accurate CQI, the multiple CRIs, RIs and PMIs should correspond to the same CQI. That is, N1 CRIs, RIs and PMIs correspond to only one CQI. If the sum of the multiple reported RIs is greater than 4, two CQIs are required. It is assumed here that the PMI and the CQI are broadband PMI and CQI. If the transmitted PMI and CQI is a sub-band PMI and CQI, the UE needs to feed back N1 sub-band PMIs and one or two CQIs for each sub-band. Specifically, if the sum of the multiple reported RIs is greater than 4, two CQIs are needed; and if the sum of the multiple reported RIs is not greater than 4, one CQI is needed.

In an embodiment, the CRI and RI that are jointly fed back and the first CQI may be fed back in CSI part 1, and all the multiple PMIs and the second CQI (if it exists) may be fed back in CSI part 2. The CSI part 1 and the CSI part 2 are coded separately. The feedback content of the CSI part 1 determines the size of the CSI part 2 since different numbers of CRIs and the number and size of RIs determine a feedback overhead of the PMIs. The size of the CSI part 1 should be fixed, which is known to both the UE and the base station. The base station can know the content and size of the CSI part 2 only after the base station demodulates the CSI part 1.

In an embodiment, the UE may independently feed back a maximum of N CRIs.

In an embodiment, the UE may also independently feed back a maximum of N RIs.

In practical applications, the number of CRIs that are fed back determines the number of RIs, the number of PMIs, the total sum of the RIs determines the number of CQIs, and the size of one RI determines the feedback overhead of the corresponding PMI. In order to simplify the implementation and fix the size of a part of CSI feedbacks, the following solution may be used.

Solution 1: the CSI is divided into two parts, respectively a CSI part 1 and a CSI part 2.

The CSI part 1 contains: all CRI reports, all RI reports and the first CQI.

The CRI may be reported jointly or separately.

The RI may be reported jointly or separately.

The CRI and the RI may be reported jointly or separately.

The CSI part 2 contains: PMIs (the number of PMIs is the same as the number of CRIs) and the second CQI (the second CQI exists if the sum of all the RIs is greater than 4).

Solution 2: the CSI is divided into two parts, respectively a CSI part 1 and a CSI part 2.

The CSI part 1 contains: the total number of CRIs, the first CRI, the first RI, and the first CQI.

The CSI part 2 contains: remaining CRIs (if the total number of CRIs is greater than 1), remaining RIs (if the total number of CRIs is greater than 1), PMIs (the number of the PMIs is the same as the number of the CRIs), and the second CQI (if the sum of all the RIs is greater than 4).

Solution 3: the CSI is divided into two parts, respectively a CSI part 1 and a CSI part 2.

The CSI part 1 contains: all CRIs, the first RI, and the first CQI.

The CSI part 2 contains: remaining RIs, PMIs (the number of the PMIs is the same as the number of CRIs) and the second CQI (if the sum of all the RIs is greater than 4).

Solution 4: the CSI is divided into three parts, respectively a CSI part 1, a CSI part 2 and a CSI part 3.

The CSI part 1 contains: all CRIs, the first RI, and the first CQI.

The CSI part 2 contains: PMI corresponding to the first CRI, and the second CQI.

The CSI part 3 contains: remaining RIs and PMIs.

In an embodiment, the CSI part 2 and the CSI part 3 may be interchanged.

Solution 5: the CSI is divided into 2N1 parts, respectively a CSI part 1, a CSI part 2 . . . .

The CSI part 1 contains: the first CRI, the first RI, and the first CQI. In an embodiment, the CSI part 1 may further include the total number of CRIs.

The CSI part 2 contains: PMI corresponding to the first CRI, and the second CQI.

The CSI part 3 contains: the second CRI and the second RI.

The CSI part 4 contains: PMI corresponding to the second CRI.

If the total number of CRIs is not greater than 1, there are only the CSI part 1 and the CSI part 2.

The CSI part 5 contains: the third CRI and the third RI.

The CSI part 6 contains: PMI corresponding to the third CRI.

If the total number of CRIs is equal to 2, there are only the CSI parts 1 to 4.

...

To sum up, according to the above solution, the UE feeds back a maximum of N CRIs, and the value of N is configured by higher layer signaling.

All the CRIs may be fed back jointly or separately. Each CRI corresponds to one RI. All the RIs may be fed back jointly or separately. The CRI and the RI may be fed back jointly or separately. Each CRI corresponds to one PMI. All the PMIs may be fed back jointly or separately. If the sum of the RIs is less than or equal to 4, one CQI is fed back (for sub-band feedback, one CQI is fed back for each sub-band); or else, two CQIs are fed back (for the sub-band feedback, two CQIs are fed back for each sub-band).

Implementation Mode 1-2:

In an NR protocol of related technologies, for a codebook Type II, the CSI part 1 contains RI, CQI, and an indication of the number of non-zero wideband amplitude coefficients per layer for the Type II CSI. The CSI part 2 contains the PMI of the Type II CSI. The CSI part 1 and the CSI part 2 are coded separately.

Similar to the Method in Embodiment 1-1:

a maximum of N CRIs may be fed back, and the value of N is configured by higher layer signaling;

all the CRIs may be fed back jointly or separately;

each CRI corresponds to one RI;

each CRI corresponds to one number of non-zero wideband amplitude coefficients;

each CRI corresponds to one PMI;

if the sum of the RIs is less than 4, one CQI is fed back; or else, two CQIs are fed back.

Implementation Mode 2-1:

For the codebook Type I, in order to improve the accuracy of measurement and feedback of the channel state quality under the transmission of multiple TRPs/panels/beams, multiple QCL sets, namely qcl-sets, may be configured in the TCI of the CSI-RS resource (there is one TCI configured in each CSI-RS resource). Each QCL set may include N qcl-Types, for example one or two qcl-Types. If one CSI-RS resource set is used for CSI measurement feedback, then the CSI-RS resource set contains one or more CSI-RS resources. The number of QCL sets contained in the TCIs of different CSI-RS resources may be different. After channel measurement, the UE will select one CSI-RS resource with the highest channel quality. The CSI-RS resource corresponds to the CRI fed back by the UE. That is, for one CSI report configuration, if the number of QCL sets which are contained in the TCI configured in the CSI-RS resource corresponding to the CRI is N, then the UE needs to feed back N RIs. The sum of the N RIs will not exceed the maximum RI capacity supported by the UE. There is a one-to-one correspondence between the N RIs fed back and the N QCL sets contained in the TCI. In this case, it is assumed that only one TCI is configured in each CSI-RS resource, but the numbers of QCL sets which are contained in the TCIs configured under different CSI-RS resources may be different.

In an embodiment, if the number of QCL sets which are contained in the TCI configured in the CSI-RS resource corresponding to the CRI is N, and the current type of feedback includes the feedback of PMI, then the UE needs to feed back N PMIs. There is a one-to-one correspondence between the N PMIs fed back and the N QCL sets contained in the TCI, and between the N PMIs fed back and the N RIs fed back. For different codebook settings, the PMI may include different components. For example, for Type I Single-Panel Codebook, the PMI may include one or more parameters selected from parameters including i1, i2, LI and the like, wherein it may be decomposed into multiple components, such as $i_{11}$, $i_{12}$ and $i_{13}$. The composition of the PMI is described in the NR protocol 38.214. For simplicity, the N PMIs may be fed back jointly.

In an embodiment, if the sum of the N RIs exceeds 4, then the UE needs to feed back two CQIs. Specifically, for a sub-band CQI feedback, the UE needs to feed back two CQIs for each sub-band; and for a wideband CQI feedback, the UE only needs to feed back two CQIs corresponding to the entire configuration bandwidth. If the sum of the N RIs does not exceed 4, then the UE only needs to feed back one CQI. Specifically, for the sub-band CQI feedback, the UE needs to feed back one CQI for each sub-band; and for the wideband CQI feedback, the UE only needs to feed back one CQI corresponding to the entire configuration bandwidth.

In an embodiment, the CRI, feedback information of the N RIs, and the first CQI may be fed back in the CSI part 1, and the second CQI (if it exists) and the PMIs may be fed back in the CSI part 2. Here, the number of PMIs is equal to N. For example, the maximum number of RIs supported by a UE0 is 8, if there are two QCL sets contained in the TCI of the CSI-RS resource corresponding to the CRI fed back, then the configuration of the RIs is shown in Table 3. Any combination of two RIs may be indicated only by using 5 bits which can represent an index in indexes 0-28. In this case, for simplicity, the CSI part 1 contains the index corresponding to the RIs, the CRI and the first CQI, and the CSI part 2 contains the PMIs and the second CQI. Here, the number of PMIs is equal to N. Of course, for more practical scheduling, some combinations of the RIs corresponding to two QCL sets may be restricted. For example, when the total number of RIs is 8, the combinations 1 and 7 may be deleted. In this case, of course, N RIs may also be fed back separately. Because the feedback information of N RIs is contained in the CSI part 1, and the payload of the CSI part 1 needs to be fixed, a feedback overhead of the RIs in the CSI part 1 should be calculated based on the maximum value for N of all the CSI-RS resources in the CSI-RS resource set. That is, a feedback overhead of the RIs is determined by the CSI-RS resource, under which a TCI that contains the most QCL sets is configured, under the CSI-RS resource set. For example, the CSI-RS resource set is configured to contain four CSI-RS resources, which are respectively CSI-RS resources 0, 1, 2, 3, and the numbers of QCL sets which are contained in the TCIs configured under the four CSI-RS resources are respectively 1, 2, 3, 1, then a feedback overhead of the RIs is determined based on the CSI-RS resource 2, even though the CRI that the UE ultimately feeds back is 0 (corresponding to the CSI-RS resource 0). If N RIs are fed back separately, and feeding back one RI needs x bits, then 3x bits are needed to feed back the RIs. Here, it is assumed that each of the CSI-RS resources in the CSI-RS resource set is configured with only one TCI.

There is another possibility of putting the CRI, N RIs and the first CQI in the CSI part 1, putting the first PMI and the second CQI (if it exists) in the CSI part 2, and putting the second PMI and the remaining PMIs in the CSI part 3 (if N is greater than 1) or putting the i-th PMI in the CSI part i+1 (i is less than or equal to N). Each CSI part is coded separately.

TABLE 3

N (N = 2) RIs are fed back

| Index (index for feedback information of N RIs) | Total RI | First RI, corresponding to the first QCL set | Second RI, corresponding to the first QCL set |
| --- | --- | --- | --- |
| 0 | 2 | 1 | 1 |
| 1 | 3 | 1 | 2 |
| 2 | 3 | 2 | 1 |
| 3 | 4 | 2 | 2 |
| 4 | 4 | 1 | 3 |
| 5 | 4 | 3 | 1 |
| 6 | 5 | 3 | 2 |
| 7 | 5 | 2 | 3 |
| 8 | 5 | 1 | 4 |
| 9 | 5 | 4 | 1 |
| 10 | 6 | 3 | 3 |
| 11 | 6 | 4 | 2 |
| 12 | 6 | 2 | 4 |
| 13 | 6 | 1 | 5 |
| 14 | 6 | 5 | 1 |
| 15 | 7 | 3 | 4 |
| 16 | 7 | 4 | 3 |
| 17 | 7 | 2 | 5 |
| 18 | 7 | 5 | 2 |
| 19 | 7 | 1 | 6 |
| 20 | 7 | 6 | 1 |
| 21 | 8 | 4 | 4 |
| 22 | 8 | 3 | 5 |
| 23 | 8 | 5 | 3 |
| 24 | 8 | 2 | 6 |
| 25 | 8 | 6 | 2 |
| 26 | 8 | 1 | 7 |
| 27 | 8 | 7 | 1 |

In an embodiment, the CRI fed back, a certain of N RIs, and the first CQI are contained in the first part of the CSI, namely the CSI part 1; the remaining RIs, the remaining CQI (if it exists) and the PMIs are contained in the second part of the CSI, namely the CSI part 2.

In an embodiment, the CSI part 1 contains the CRI, the sum of the N RIs, and the first CQI, and the CSI part 2 contains the second CQI (if it exists) and the PMIs. The CSI part 2 may further include information for differentiating the RIs corresponding to different QCL sets. For example, assuming that the maximum number of RIs supported by the UE0 is 8, the RI included in the CSI part 2 is the RI corresponding to the first QCL set, represented as RI_1, and the value of the RI corresponding to the second QCL set is equal to 8-RI_1.

In general, N RIs and PMIs are fed back for N QCL sets contained in the TCI, and then the CQI is calculated based on the N RIs and PMIs. The CQI is calculated based on the N RIs and PMIs. Herein, N is a positive integer which may be 1, 2 or 4, etc. The values of N for the TCIs of different CSI-RS resources may be different and are configured by higher layer signaling. After receiving the CRI, N RIs, N PMIs and one or two CQIs fed back by the UE, the base station transmits a data block on N beams/panels/TRPs correspondingly using the N RIs and PMIs that are fed back. The size of the data block may be determined based on the CQI fed back. It can be concluded that, for the simultaneous transmission based on multiple beams/panels/TRPs, the method described here introduces a corresponding feedback so that the accuracy can be greatly improved. One CQI described here is used for indicating the channel quality for one code word, and two CQIs are used for indicating the channel quality for two code words. For the sub-band feedback, one or two CQIs may be fed back for each sub-band. The feedback of the PMI may also be sub-band based feedback.

If the number of QCL sets contained in the CSI-RS resource corresponding to the CRI fed back is 3, then the following correspondence can be adopted.

If the sum of the first RI and the second RI does not exceed 4, the first CQI corresponds to the first two RIs and the corresponding PMIs, and the last RI and the corresponding PMI correspond to the second CQI.

If the sum of the second RI and the third RI does not exceed 4, the first CQI corresponds to the second RI, the third RI and the corresponding PMIs, and the second CQI corresponds to the remaining RI and the corresponding PMI.

If the sum of the first RI and the third RI does not exceed 4, the first CQI corresponds to the first RI, the third RI and the corresponding PMIs, and the second CQI corresponds to the remaining RI and the corresponding PMI.

Or, if the sum of the RIs corresponding to any two of three QCL sets does not exceed 4, then the two RIs and the corresponding PMIs correspond to the first CQI, and the remaining RI and the corresponding PMI correspond to the second CQI. In an embodiment, if the sum of the RIs corresponding to any two of three QCL sets does not exceed 4, then the two RIs and the corresponding PMIs correspond to the second CQI, and the remaining RI and the corresponding PMI correspond to the first CQI.

If the number of QCL sets contained in the CSI-RS resource corresponding to the CRI fed back is 4, then the following correspondence can be adopted.

The first two QCL sets correspond to the first CQI, and the last two QCL sets correspond to the second CQI.

As a brief summary of the above solution, if one TCI is configured in the CSI-RS resource corresponding to the CRI fed back, and the TCI includes N RS sets or QCL sets, then the UE feeds back N RIs which correspond to N RS sets/QCL sets respectively. The N RIs may be fed back jointly or separately. If the sum of the N RIs is less than or equal to 4, one CQI is fed back; or else, two CQIs are fed back.

Implementation Mode 2-2:

In the current NR protocol, for the codebook Type II, the CSI part 1 contains RI, CQI, and an indication of the number of non-zero wideband amplitude coefficients per layer for the Type II CSI. The CSI part 2 contains the PMI of the Type II CSI. The CSI part 1 and the CSI part 2 are coded separately.

Similar to the Method in Embodiment 2-1:

if one TCI is configured in the CSI-RS resource, and the TCI contains N RS sets or QCL sets, N RIs respectively corresponding to the N RS sets/QCL sets are fed back, and the N RIs may be fed back jointly or separately;

N numbers of non-zero wideband amplitude coefficients are fed back (respectively corresponding to the N RS sets or QCL sets);

N PMIs respectively corresponding to the N RS sets are fed back;

if the sum of the N RIs is less than or equal to 4, one CQI is fed back; or else, two CQIs are fed back.

Implementation Mode 3

If the number of QCL sets in a TCI is always 1, the implementation mode 2-1 above will not work. A method capable of reducing the overhead and obtaining the accurate CSI for multiple beams/panels/TRPs used for simultaneous transmission is that more than one TCI may be configured for a CSI-RS resource. When a Physical Downlink Shared Channel (PDSCH) is transmitted in practical applications, multiple TCIs may also need to be configured for the PDSCH or DMRS. Therefore, if a CSI-RS resource set is used for CSI measurement feedback, then the CSI-RS resource set includes one or more CSI-RS resources. The numbers of TCIs included in the configurations of different CSI-RS resources may be different. For example, the number of TCIs included in the configuration of a certain CSI-RS resource may be 1, and the number of TCIs included in the configuration of some other CSI-RS resource may be greater than 1, for example, the number of TCIs may be 2. After channel measurement, the UE will select one CSI-RS resource with the highest channel quality. The CSI-RS resource corresponds to the CRI fed back by the UE. That is, for one CSI report configuration, if the number of TCIs configured in the CSI-RS resource corresponding to the CRI is N, then the UE needs to feed back N RIs. The N RIs correspond to N PMIs. If the sum of the N RIs is not greater than 4, only one CQI is fed back; or else, two CQIs are fed back. The N RIs may be coded jointly or separately.

Similarly, for the Type II Codebook:
if the CSI-RS resource is configured with N TCIs;
then N RIs respectively corresponding to the N TCIs are fed back;
the N RIs may be fed back jointly or separately;
N numbers of non-zero wideband amplitude coefficients are fed back (respectively corresponding to N TCIs);
N PMIs respectively corresponding to the N TCIs are fed back;
if the sum of the N RIs is less than or equal to 4, one CQI is fed back; or else, two CQIs are fed back.

For the design of the Type II codebook, no CRI is fed back at present, that is, only one CSI-RS resource is configured in the CSI-RS resource.

If the feedback information of N RIs is contained in the CSI part 1, and the payload of the CSI part 1 needs to be fixed, a feedback overhead of the RIs in the CSI part 1 should be calculated based on a maximum value of N of all the CSI-RS resources in the CSI-RS resource set. That is, a feedback overhead of the RIs is determined based on a CSI-RS resource, which is configured with the most TCIs, in the CSI-RS resource set.

For all the above embodiments, if the number of CSI-RS resources configured in the CSI-RS resource set is 1, the CSI feedback is not required. In this case, the value of N is determined by the number of TCIs configured in the CSI-RS resource and the number of QCL sets configured in the TCI.

It can be concluded from all the above solutions that the value of N is determined by the number of CRIs fed back, the number of TCIs included in the CSI-RS resource(s) corresponding to the CRI, and the number of QCL sets included in these TCIs. Simply, N is equal to the total number of QCL sets included in the CSI-RS resource(s) corresponding to all the CRIs fed back. That is, for one CSI report configuration, N pieces of feedback information are determined, wherein N is equal to the total number of QCL sets which are contained in all the TCIs configured in the CSI-RS resource(s) corresponding to all the CRIs fed back. The feedback information includes: RI, PMI and non-zero wideband amplitude coefficient fed back. N is an integer greater than or equal to 1. When a sum of the N RIs is less than or equal to 4, the feedback information further includes one CQI, and when the sum of the N RIs is greater than 4, the feedback information further includes two CQIs.

Embodiment 4

The embodiments of the present application further provide a storage medium. The storage medium stores a computer program. The computer program is configured to perform operations in any of the above method embodiments at runtime.

In the present embodiment, the storage medium may be configured to store a computer program for performing the following operations S1 and S2.

At S1, N pieces of feedback information are determined according to one CSI report configuration. Each piece of feedback information includes an RI, a PMI, and a non-zero wideband amplitude coefficient that is fed back. In the embodiment, N is an integer greater than or equal to 1.

At S2, the N pieces of feedback information are sent to the base station.

In an embodiment, the storage media may include, but not limited to, a USB flash disk, a Read-Only Memory (ROM), a Random Access Memory (RAM), a mobile hard disk, a magnetic disk, a compact disc, and other media capable of storing the computer program.

The embodiments of the present application also provide an electronic device, which includes a memory and a processor. The memory stores a computer program. The processor is configured to run the computer program to perform operations in any of the above method embodiments.

In an embodiment, the electronic device may further include a transmission device and an input/output device. The transmission device is connected with the processor, and the input/output device is connected with the processor.

In an embodiment, the processor may be configured to run the computer program to perform the following operations S1 and S2.

At S1, N pieces of feedback information are determined according to one CSI report configuration. Each piece of feedback information includes an RI, a PMI, and a non-zero wideband amplitude coefficient that is fed back. In the embodiment, N is an integer greater than or equal to 1.

At S2, the N pieces of feedback information are sent to the base station.

Optionally, specific implementations for the present embodiment may refer to the examples described in the above embodiments and alternative implementations, and details are not repeated in the present embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

What is claimed is:
1. An information feedback method, comprising:
determining N pieces of feedback information according to one Channel State Information (CSI) report configuration, wherein the N pieces of feedback information comprise N Rank Indications (RIs) and N Precoding Matrix Indications (PMIs), and N is an integer greater than or equal to 1; and sending the N pieces of feedback information to a base station, wherein the N pieces of feedback information further comprise: N numbers of non-zero wideband amplitude coefficients that are fed back; wherein N is equal to the number of Quasi Co-Location (QCL) sets which are contained in one or more Transmission Configuration Indicators (TCIs) respectively configured in one or more Channel State Information Reference Signal (CSI-RS) resources corresponding to one or more CSI-RS Resource Indicators (CRIs); the N pieces of feedback information further comprise the one or more CRIs; and the one or more CSI-RS resources corresponding to the one or more CRIs are one or more CSI-RS resources contained in a CSI-RS resource set.

2. The method as claimed in claim 1, wherein when a sum of the N RIs is less than or equal to 4, the N pieces of feedback information further comprise one Channel Quality Indicator (CQI); and when the sum of the N RIs is greater than 4, the N pieces of feedback information further comprise two CQIs.

3. The method as claimed in claim 1, wherein N is equal to the number of Transmission Configuration Indicators (TCIs) configured in one or more Channel State Information Reference Signal (CSI-RS) resources corresponding to one or more CSI-RS Resource Indicators (CRIs); the N pieces of feedback information further comprise the one or more CRIs; and the one or more CSI-RS resources corresponding to the one or more CRIs are one or more CSI-RS resources contained in a CSI-RS resource set.

4. The method as claimed in claim 3, wherein a feedback overhead of the RIs is determined based on a CSI-RS resource, which is configured with the most TCIs, in the CSI-RS resource set.

5. The method as claimed in claim 1, wherein N is equal to the number of one or more CSI-RS Resource Indicators (CRIs), or the number of feedback CSI-RS resources.

6. The method as claimed in claim 5, wherein the number of Quasi Co-Location (QCL) sets configured in each CSI-RS resource in the CSI-RS resource set is equal to 1.

7. The method as claimed in claim 5, wherein a maximum value of N is notified by higher layer signaling to User Equipment (UE).

8. The method as claimed in claim 1, wherein the number of the one or more CRIs is 1.

9. The method as claimed in claim 1, wherein when there is only one CSI-RS resource configured in the CSI-RS resource set, the N pieces of feedback information do not comprise the one or more CRIs.

10. The method as claimed in claim 1, wherein a feedback overhead of the RIs is determined based on a CSI-RS resource, which is configured with a TCI containing the most QCL sets, in the CSI-RS resource set.

11. The method as claimed in claim 1, wherein the N RIs are jointly fed back by a same signaling.

12. The method as claimed in claim 1, wherein when N is greater than 1, the first PMI is set in a CSI part 2, and the second PMI is set in a CSI part 3.

13. The method as claimed in claim 1, wherein there is a one-to-one correspondence among the N RIs, the N PMIs and the N numbers of non-zero wideband amplitude coefficients that are fed back.

14. An information feedback method, comprising:
receiving N pieces of feedback information sent by User Equipment (UE) according to one Channel State Information (CSI) report configuration, wherein the N pieces of feedback information comprise N Rank Indications (RIs) and N Precoding Matrix Indications (PMIs), and N is an integer greater than or equal to 1, wherein the N pieces of feedback information further comprise: N numbers of non-zero wideband amplitude coefficients that are fed back, wherein N is equal to the number of Quasi Co-Location (QCL) sets which are contained in one or more Transmission Configuration Indicators (TCIs) configured in one or more Channel State Information Reference Signal (CSI-RS) resources corresponding to one or more CSI-RS Resource Indicators (CRIs); the N pieces of feedback information further comprise the one or more CRIs; and the one or more CSI-RS resources corresponding to the one or more CRIs are one or more CSI-RS resources contained in a CSI-RS resource set.

15. The method as claimed in claim 14, wherein when a sum of the N RIs is less than or equal to 4, the N pieces of feedback information further comprise one Channel Quality Indicator (CQI); and when the sum of the N RIs is greater than 4, the N pieces of feedback information further comprise two CQIs.

16. The method as claimed in claim 14,
N is equal to the number of TCIs configured in one or more CSI-RS resources corresponding to one or more CRIs; the N pieces of feedback information further comprise the one or more CRIs; and the one or more CSI-RS resources corresponding to the one or more CRIs are one or more CSI-RS resources contained in a CSI-RS resource set;
or,
N is equal to the number of one or more CRIs, and the N pieces of feedback information further comprise the one or more CRIs.

17. An information feedback device, comprising: a memory and a processor, wherein the memory stores a computer program, and the processor is configured to run the computer program to:
determine N pieces of feedback information according to one Channel State Information (CSI) report configuration, wherein the N pieces of feedback information comprise N Rank Indications (RIs) and N Precoding Matrix Indications (PMIs), and N is an integer greater than or equal to 1; and
send the N pieces of feedback information to a base station, wherein the N pieces of feedback information further comprise: N numbers of non-zero wideband amplitude coefficients that are fed back, wherein N is equal to the number of Quasi Co-Location (QCL) sets which are contained in one or more Transmission Configuration Indicators (TCIs) configured in one or more Channel State Information Reference Signal (CSI-RS) resources corresponding to one or more CSI-RS Resource Indicators (CRIs); the N pieces of feedback information further comprise the one or more CRIs; and the one or more CSI-RS resources corresponding to the one or more CRIs are one or more CSI-RS resources contained in a CSI-RS resource set.

* * * * *